United States Patent
Subhraveti et al.

(10) Patent No.: US 8,370,841 B2
(45) Date of Patent: Feb. 5, 2013

(54) OPTIMIZING DETERMINISTIC EVENT RECORD AND REPLAY OPERATIONS

(75) Inventors: Dinesh Subhraveti, Milpitas, CA (US); Philippe Bergheaud, Colmar (FR); Marc Vertes, Saint Lys (FR)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 12/275,926

(22) Filed: Nov. 21, 2008

(65) Prior Publication Data

US 2009/0144742 A1   Jun. 4, 2009

(30) Foreign Application Priority Data

Nov. 30, 2007   (EP) ..................................... 07301604

(51) Int. Cl.
*G06F 9/46* (2006.01)
*G06F 12/00* (2006.01)
(52) U.S. Cl. ........................ 718/102; 710/244
(58) Field of Classification Search ................. None
See application file for complete search history.

(56) References Cited

U.S. PATENT DOCUMENTS

| | | | | |
|---|---|---|---|---|
| 4,812,968 | A * | 3/1989 | Poole ............................... | 710/37 |
| 5,895,485 | A | 4/1999 | Loechel et al. | |
| 5,968,185 | A | 10/1999 | Bressoud et al. | |
| 6,077,260 | A | 6/2000 | Wheelock et al. .............. | 606/32 |
| 6,832,367 | B1 | 12/2004 | Choi et al. | |
| 7,290,056 | B1 | 10/2007 | McLaughlin, Jr. | |
| 7,774,647 | B2 * | 8/2010 | Vertes .............................. | 714/15 |
| 2002/0065948 | A1 | 5/2002 | Morris et al. | |
| 2004/0078618 | A1 | 4/2004 | Moser et al. | |
| 2009/0328044 | A1 | 12/2009 | Bergheaud et al. | |

FOREIGN PATENT DOCUMENTS

| | | |
|---|---|---|
| FR | 2881309 A1 | 7/2006 |
| WO | WO 2006/077260 A1 | 7/2006 |
| WO | WO 2006/079623 A1 | 8/2006 |
| WO | WO 2008/025575 A1 | 3/2008 |

OTHER PUBLICATIONS

Bacon, David F. et al., "File System Measurements and their Application to the Design of Efficient Operation Logging Algorithms", Computer Science Division, University of California, Berkeley and IBM T.J. Watson Research Center, IEEE 1991, pp. 21-30.

(Continued)

*Primary Examiner* — Jennifer To
*Assistant Examiner* — Wissam Rashid
(74) *Attorney, Agent, or Firm* — Stephen J. Walder, Jr.; Libby Z. Toub

(57) ABSTRACT

Mechanisms for managing task events during the scheduling period of a task executing on a processor. Only events of specific portions of the scheduling period are logged, wherein a first shared resource access has been granted for the task, this portion of the scheduling period involving gathering all the non-deterministic events which cannot be replayed by simple task re-execution. Other independent non-deterministic event records are still logged as usual when they occur out of the portion of the scheduling period for which a record has been created. This limits the number of logged events during a recording session of an application and limits the frequency of events to transmit from the production machine to the replay machine.

16 Claims, 6 Drawing Sheets

OTHER PUBLICATIONS

Bacon, David F. et al., "Hardware-Assisted Replay of Multiprocessor Programs", University of California, Berkeley and IBM Watson Research Center, ACM, 1991, pp. 194-206.

Basile, Claudio et al., "Active Replication of Multithreaded Applications", University of Illinois at Urbana-Champaign, Center of Reliable and High-Performance Computing, 2002, pp. 1-26.

Basile, Claudio et al., "Loose Synchonization of Multithreaded Replicas", Center for Reliable and High-Performance Computing, University of Illinois at Urbana-Champaign, IEEE, 2002, pp. 250-255.

Bressoud, Thomas C., "TFT. A Software System for Application—Transparent Fault Tolerance", Stratus Computer Inc., 1998, 10 pages.

Choi, Jong-Deok et al., "A Perturbation-Free Replay Platform for Cross-Optimized Multithreaded Applications", IBM T.J. Watson Research Center, International Parallel and Distributed Processing Symposium, San Francisco, CA, Apr. 23-27, 2001, 10 pages.

Christiaens, Mark et al., "Record/Replay in the Presence of Benign Data Races", International Conference on Parallel and Distributed Processing Techniques and Applications (PDPTA), 2002, 7 pages.

Christodoulopoulou, Rosalia et al., "Dynamic Data Replication: an Approach to Providing Fault-Tolerant Shared Memory Clusters", University of Toronto, In Proceedings of the Ninth Annual Symposium on High Performance Computer Architecture, 2003, pp. 1-12.

Cornelis, Frank et al., "A Taxonomy of Execution Replay Systems", Department of Electronics and Information Systems, Ghent University, 2001, 10 pages.

Dionne, Carl et al., "A Taxonomy of Distributed Debuggers Based on Execution Replay", Universite de Montreal, Proceedings of the International Conference on Parallel and Distributed Processing Techniques and Applications (PDPTA '96), Sunnyvale, California, Aug. 9-11, 1996, 12 pages.

Goldberg, Arthur et al., "Transparent Recovery of Mach Applications", IBM T.J. Watson. 1990, pp. 1-29.

Herdieckerhoff, Martin et al., "A Distributed Execution Replay Facility for CHORUS", Chorus Systemes, 1994, 10 pages.

Huang, Yennun et al., "Why Optimistic Message Logging Has Not Been Used in Telecommunications Systems", AT&T Bell Laboratories, IEEE, 1995, pp. 459-463.

Huselius, Joel, "Debugging Parallel Systems: A State of the Art Report", Department of Computer Engineering, Malardalens University, Vasteras, Sweden, MRTC Report No. 63, Sep. 2002.

Jimenez-Peris, Ricardo et al., "Deterministic Scheduling for Transactional Multithreaded Replicas", Technical University of Madrid, Citeseer entry, IEEE, 2000, pp. 164-173.

Johnson, David B. et al., "Recovery in Distributed Systems Using Optimistic Message Logging and Checkpointing", Department of Computer Science, Rice University, 1988, 27 pages.

McKenney, P.E. et al., "Read-Copy Update: Using Execution History to Solve Concurrency Problems", Sequent, pp. 1-28, 1998.

Mellor-Crummey, J.M. et al., "A Software Instruction Counter", Computer Science Department, University of Rochester, 1989, 9 pages.

Narayanasamy, Satish et al., "BugNet: Continuously Recording Program Execution for Deterministic Replay Debugging", Proceedings of the International Symposium on Computer Architecture (ISCA 2005), Jun. 2005, 12 pages.

Poledna, Stefan et al., "Replica Determinism and Flexible Scheduling in Hard Real-Time Dependable Systems", IEEE Transactions on Computers, vol. 49, No. 2, Feb. 2000, pp. 100-111.

Powell, D. et al., "GUARDS: A Generic Upgradable Architecture for Real-Time Dependable Systems", IEEE Transactions on Parallel and Distributed Systems, vol. 10, No. 6, Jun. 1999, pp. 580-599.

Price, Daniel B., "New Techniques for Replay Debugging", Department of Computer Science, Brown University, May 1, 1998, pp. 1-18.

Ronsse, Michiel et al., "Debugging shared memory parallel programs using record/replay", Ghent University, Future Generation Computer Systems 19 (2003), Elsevier Science B.V. 2002, pp. 679-687.

Ronsse, Michiel et al., "Execution replay and debugging", Universite de Ghent, IMAG Grenoble, 2001, arXiv:cs/0011006v1 [cs.SE] Nov. 6, 2000, pp. 1-21.

Russinovich, Mark et al., "Operating System Support for Replay of Concurrent non-Deterministic Shared Memory Applications", Department of Computer Science, University of Oregon, 1995, 5 pages.

Saito, Yasushi, "Jockey: A user-space library for record-replay debugging", HP Laboratories Palo Alto, Hewlett-Packard Development Company, L.P., 2005, 12 pages.

Schneider, Fred B., "Implementing Fault-Tolerant Services Using the State Machine Approach: A Tutorial", Cornell University, ACM Computing Surveys, vol. 22, No. 4, Dec. 1990, pp. 299-319.

Slye, J. Hamilton et al., "Support for Software Interrupts in Log-Based Rollback-Recovery", IEEE Transactions on Computers, vol. 47, No. 10, Oct. 1998, pp. 1113-1123.

Sosic, Rok, "History Cache: Hardware Support for Reverse Execution", Griffith University, Queensland Australia, Appeared in Computer Architecture News, vol. 22, 5, pp. 11-18, Dec. 1994, 1994, 9 pages.

Sosic, Rok, "The Many Faces of Introspection", Department of Computer Science, The University of Utah, Jun. 1992, 203 pages.

Srinivasan, Sudarshan M. et al., "Flashback. A Lightweight Extension for Rollback and Determistic Replay for Software Debugging", Department of Computer Science, University of Illinois, Urbana-Champaign, in Usenix 2004, 15 pages.

Strom, Robert E. et al., "Volatile Logging in n-Fault-Tolerant Distributed Systems", IBM T.J. Watson Research Center, IEEE 1988, pp. 44-49.

Thane, Henrik et al., "Replay Debugging of Real-Time Systems Using Time Machines", Proceedings of the International Parallel and Distributed Processing Symposium (IPDPS'03), Apr. 2003, 8 pages.

PCT Search Report and Written Opinion, International Application Serial No. PCT/EP2007/053122 dated Sep. 17, 2007, 10 pages.

USPTO Application U.S. Appl. No. 12/438,744, 2 pages.

Barga, Roger et al., "Improving Logging and Recovery Performance in Phoenix/App", Proceedings of the 20th International Conference on Data Engineering, ICDE 2004, Boston, Massachusetts, 2004, pp. 486-497.

Vertes, Marc, "Design of the Meiosys Record and Replay Module", Apr. 12, 2005, 7 pages.

Vertes, Marc et al., "Deterministic Replay in Multi-Processor Systems", Dec. 23, 2004, 12 pages.

Vertes, Marc, "Deterministic Replay in Transactional Multitask Applications", Mar. 2, 2004, 14 pages.

Vertes, Marc, "Optimizing Deterministic Replay with Exclusive Access Periods", Jul. 12, 2005, 9 pages.

Response to Final Office Action Aug. 31, 2012 for U.S. Appl. No. 12/438,744, 18 pages.

* cited by examiner

OPTIMIZING DETERMINISTIC EVENT RECORD AND REPLAY OPERATIONS

CROSS-REFERENCE TO FOREIGN APPLICATION

This patent application claims the benefit of the priority date of a prior foreign application filed under 35 U.S.C. §119, namely counterpart European Patent Application No. EP07301604.0, entitled "A Method, System and Computer Program to Optimize Deterministic Even Record and Play" which was filed on Nov. 30, 2007 and is incorporated herein by reference in its entirety.

FIELD OF THE INVENTION

The present invention generally relates to performing record and replay of applications; more particularly the invention improves performance for record and replay of deterministic events.

BACKGROUND OF THE INVENTION

With record and replay of applications, the goal is to allow the simultaneous identical execution of an application, for instance, on different machines. This implies that not only the execution has to be reproduced identically, but it must occur at nearly the same time on a different host, despite the constraint of being remote (network latency, bandwidth) and with a minimal performance degradation.

On the other hand, the operating systems running on multi-processor machines able to operate in parallel must be adapted in order to allow record and replay of an application which is executing non deterministic events. Between those events, the application execution depends only from its initial state and program instructions and is, therefore, deterministic. In the case of parallel architecture, such as a multi-processor computer or a network comprising a number of computers running in parallel, the use of shared resources accessible by a plurality of tasks adds a cause of non-determinism: the ordering of access to a shared resource by concurrent tasks.

In the simple case where a particular instruction or system call returns a non-predictable result, it is sufficient to instrument this operation in order to record its result during the original execution and at replay, to simulate it and to force its result from the recorded value. A set of instructions and system calls which are deterministic on private unshared memory become totally non-deterministic when operating on shared memory because of the uncertainty of the initial state caused by the concurrent use of memory by other tasks, as described above. Rather than instrumenting each and every program instruction, the same applicant has proposed a method to ensure the exclusive access to the shared memory during a scheduling period by a single task, thus restoring the deterministic property of an instruction block, as described in the international patent application 'Method for optimizing the logging and replay of multi-task applications in a monoprocessor or multi-processor computer system' published under the number WO 2006/077260. As described in this patent application, during the recording session, one fifo queue per CPU is used for recording each task schedule period information and one fifo queue per shared resource is used for recording each exclusive access to that shared resource during task execution. During the replaying session, the logging data of fifo queues transmitted to the replay machine are serialized to constitute the replay scheduling. The events are replayed according to the replay scheduling on each record from a CPU fifo generating a stop of the corresponding task execution.

A record of a task scheduling period in one CPU fifo contains the information on the event having caused task interruption: the event can be a system call interrupt, a scheduler interrupt or a shared resource access interrupt. At replay, if the event from a CPU fifo is a scheduler interrupt (called UIC because it uses user instruction count), then an interrupt is programmed to force the task to stop at the correct instruction count before resuming the task. The interrupt will be either triggered by a performance monitoring counter register overflow (the PMC counting user instructions) or a software breakpoint. After the task resumes and suspends again, the task state is matched against the expected stop condition.

Three possible results can occur from the match. The first possible result involves an unexpected scheduler, or breakpoint interrupt, before the next stop condition: the task needs simply to be resumed. The second possible result involves unexpected shared resource access, or system call interrupt. For example, the replay session has diverged before and is now entirely wrong. This is a replay error, The third possible result is an expected stop condition. The replay can proceed and the next event can be de-queued from the log.

Thus, with the solution of the prior art patent application, all the interrupts of multi-task applications are logged and replayed accurately in such a multi-processor environment.

However, logging too many events is costly and has a negative impact on performances, especially with remote logging: event logging is costly from an amount of storage point of view and for transferring the information from the recording machine to the replaying machine when it is remote; the impact on performances comes from the time to record and replay and the time to transfer event information.

Within this model, it is also impossible to formally ensure that there will be enough room in log fifos to store all the necessary events until the end of the scheduling period because one cannot predict how many system calls or exclusive accesses to shared resources will be performed before the release.

SUMMARY OF THE INVENTION

It is an object of the present invention to provide a reliable record and replay function for non-deterministic events due to parallel environment, in particular, for multi-task applications.

It is a further object of the present invention to optimize the performances of event record and replay by reducing the amount of event information to be recorded on the recording machine, transferred to the replaying machine if it is remote, and then used for replay on the replaying machine.

The aforementioned aspects and other objectives and advantages can now be achieved as described herein. A method, system and computer program are disclosed for managing task events during the scheduling period of a task executing on one of the CPUs of a multi-processor computer. Only events of specific portions of scheduling period are logged wherein a first shared resource access has been granted for the task, this portion of scheduling period gathering all the non-deterministic events which cannot be replayed by simple task re-execution. Other independent non-deterministic event records are still logged as usual when they occur out of the portion of scheduling period for which a record has been created. This limits the number of logged events during recording session of an application and the frequency of events to transmit from the production machine to the replay machine.

The principle of the invention is that the method distinguishes which interrupts are relevant or not (i.e., which ones need to be reproduced identically to ensure deterministic replay and which ones can be ignored). Only signals and schedule-out events occurring after the exclusive access resources are identically replayed. Also, several non-deterministic events are grouped into a unique event record. The last event of grouped records is a non-abortable event (NAE) that is an event that modifies the state of the external world. Further, advantages can be listed as follows: the implementation of the invention requires changes in the operating system without any change requirement on hardware or record and replay machines. This technique is suitable for generic fault-tolerance systems. The new architecture described in the present invention improves the prior art architecture defined in the international patent application cited in the background art of the present document as follows: with this architecture, only interrupt events relevant to non-deterministic behavior are recorded. The discrimination of such events is based on type of resource involved (shared or not) and context of event (at start or within a scheduling period) used to arbitrate if we record the resource access details, or simply the number of occurrences of resource access.

The disclosed approach is also capable of excluding data among what, for example, constitutes a relevant scheduling period to be recorded and replayed, such as, non-relevant data. It selects the event information to record in order to have only one event per scheduling period instead of many, which allows robustness of log resource checking. Compared to the solution of the prior art described in the patent application cited in the background art, the solution of the invention simplifies the architecture by removing entirely the specific shm channel (QJShMPi in FIG. 9 of the international patent application WO 2006/077260). As described later in the document, the solution is based on distinguishing between 'exclusive access period' and non-exclusive access periods included in the scheduling period of a task. Such exclusive access period starts when the task is granted for the first time a shared resource and ends when the last shared resource acquired during the period has been released by the activated task.

DETAILED DESCRIPTION

Figure 1:
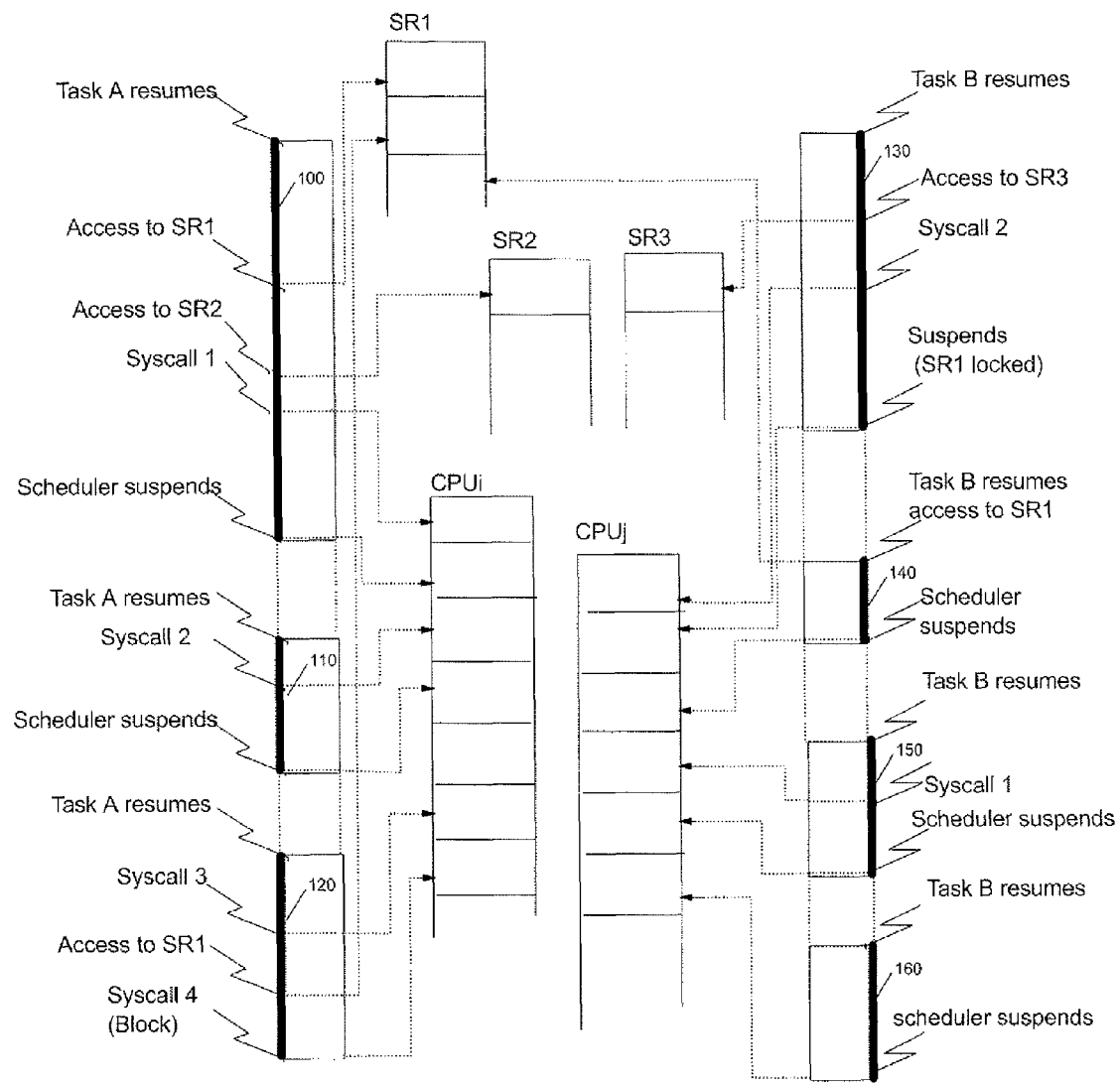
FIG. 1 illustrates the record process with the method of the prior art.

FIG. 1 illustrates the record process with the method of the prior art. As illustrated in (FIG. 9) the international patent application WO 2006/077260 of the prior art, during the recording session of tasks executing on a multiprocessor system, fifo queues are used to store event information. One fifo queue per each CPU (QJIProX, QJIProY) is used for logging each task schedule period information event and one fifo queue per shared resource (QJhMPi) is used for recording each exclusive access to that shared resource during task execution. FIG. 1 illustrates on one example the frequency of logging in the per CPU and per shared resource queues.

In this example of a recording session, an application of 2 processes A and B run on a multi-processor machine, composed of processors CPUi and CPUj. A and B use shared resources SR1, SR2, SR3 (for example, 3 distinct shared memory pages). On CPUi, a first scheduling period (100) starts when task A resumes and ends when the scheduler suspends. During this first scheduling period, a first shared resource is accessed and information on this access is logged in the first shared resource queue (SR1), one second shared resource is also accessed and information on this access is logged in the second shared resource queue (SR2). In this same scheduling period, an event information is logged for a system call interrupt (Syscall1) and for the Scheduler suspending task A in a CPUi queue for the processor on which the corresponding system call is executed. During a second activation period (110) of task A, no shared resource is accessed, only one second event information is logged for a system call interrupt (Syscall2) in the same CPUi queue for the processor on which the corresponding system call is executed. During the third period of activation (120), two system call events are logged into the CPUi queue and one access to the first shared resource is logged in the SR1 queue. Syscall4 is a blocking system call making a Scheduler suspends and SR1 released. During this time, task B is scheduled with four scheduling periods (130, 140, 150, and 160) on a second processor. During the first activation period (130) for task B, the information on an access to a third shared resource is logged in a corresponding SR3 fifo queue. The first activation period for task B ends when the task is suspended because it cannot access the first shared resource which is reserved by task A during its first period of activation. Task B resumes when the first shared resource is released by suspension of task A. The information of the event of the first shared resource is reserved to process B is logged in the SR1 first shared resource queue. During the activation period of process B, similarly to what is done during the activation periods of process A, the event information are logged in the CPUj queue for the second processor on which process B is executed.

To improve the architecture of FIG. 1 for recording of application executing on a multiprocessor, it is noted that, in general, not all the interrupts need to be logged and replayed, but only the ones related to relevant non-deterministic events at the application global state level. When applying this principle to the solution of the prior art, for example, the scheduler interrupts, which define scheduling periods where no shared resource was accessed, do not need to be recorded and replayed the same, as they do not have any impact on the non-determinism of the application. Such events can be replayed by simple task code re-execution.

Now, still starting from the architecture for recording applications executing on a multiprocessor, considering shared memory accesses during a scheduling period, only the first access needs to be logged. All the following ones are implicit, even on different pages, if they occur within the same scheduling period. It is sufficient to record the number of occurrences of a shared resource access, rather than all the operation details.

The same applies for system calls, wherein we need to record only the number of occurrences rather than the full system call details.

A significant period for the process, an Exclusive Access Period (EAP), is herein defined. The EAP starts at the first successful access of a shared resource since the task resumed and ends when the task releases the last shared resource it has successfully exclusively accessed. The EAP defines the period during which a task running on a CPU holds exclusively one or more shared resources.

Shared resource exclusive access grants are released usually when the timeslice expires, but this can also happen if a new non-determinist event, not necessarily related to a shared resource, happens.

It can be advantageous, during the course of recording, to arbitrarily end an EAP in order to ensure that the next event will be recordable. On the other hand, an EAP may accumulate many intermediate non-determinist events as long as they are of fixed size and that space is available in the log fifo. If the fifo becomes full, then the EAP is closed and committed in its current state and the event that could not be logged is used to open a new EAP. In summary, there is one recorded event per scheduling period. The event is recorded first in a local fifo before being taken in charge by a logging task that is notified by changes in the fifo.

Figure 2:
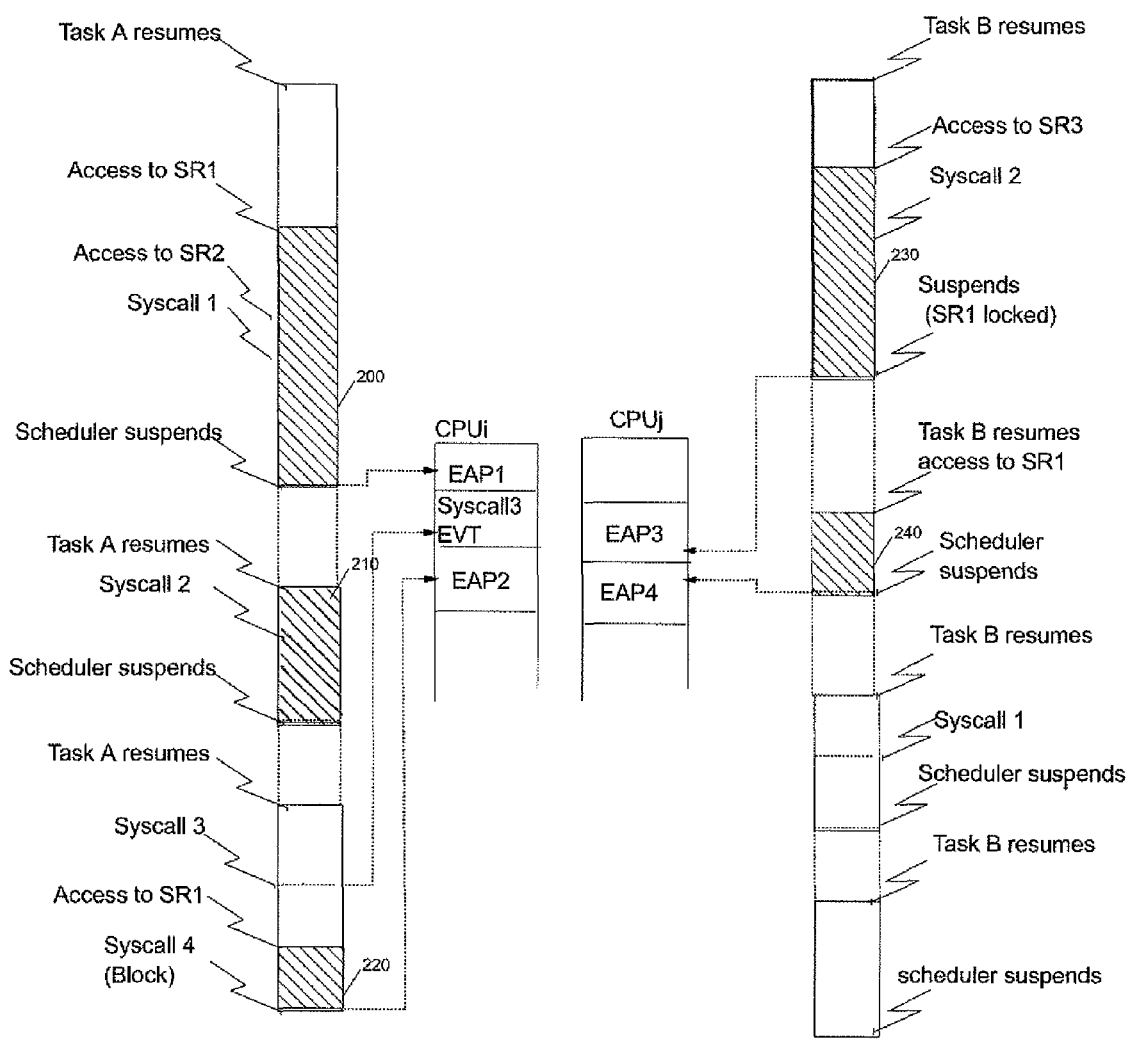
FIG. 2 illustrates the recording of event information during the task execution periods, wherein also illustrated are the successive Exclusive Access periods according to the preferred embodiment.

FIG. 2 illustrates the recording of event information during the task execution periods, wherein also illustrated are the successive Exclusive Access periods (rectangles with hatchings 200, 210, 220 for process A and 230, 240 for process B) according to the preferred embodiment. The same example is illustrated in FIG. 2 for a recording session as in FIG. 1 of an application of 2 processes A and B running on a multi-processor machine, composed of processors CPUi and CPUj. A and B use shared resources SR1, SR2, SR3 (for example, 3 distinct shared memory pages). On CPUi, the first EAP (200) during the first scheduling period for process A, is defined between the first access to SR1 and the scheduler suspends. Only one recorded event is generated, instead of 4 during this first scheduling period of process A with the solution of prior art recording each interrupt. During the second scheduling period of A, no shared resource is accessed and the system call Syscall2 doesn't carry non-determinist information. Therefore, no event needs to be recorded for this scheduling period. During the third scheduling period for process A, Syscall3 system call is logged in CPUi queue because it is a non-deterministic system call.

The event information logged is of variable size, as described in more details below.

There can be several reasons to end an EAP, that is to release hold shared resources and log an event record in the local fifo:
- expiration of timeslice for the task, which is scheduled out;
- blocking system call (for example, waiting for a response from a physical device);
- blocking access to a shared resource which is already held by a concurrent task. This is detected by a failure to get exclusive access lock;
- no space available in local fifo for further event recording, therefore, inducing task blocking. This condition is checked at each sub-event start (entering a system call, hitting a new shared resource), thus allowing to record the already executed EAP;
- beginning of an external I/O system call for which the indicated input size is larger than the available fifo space.

Figure 3:
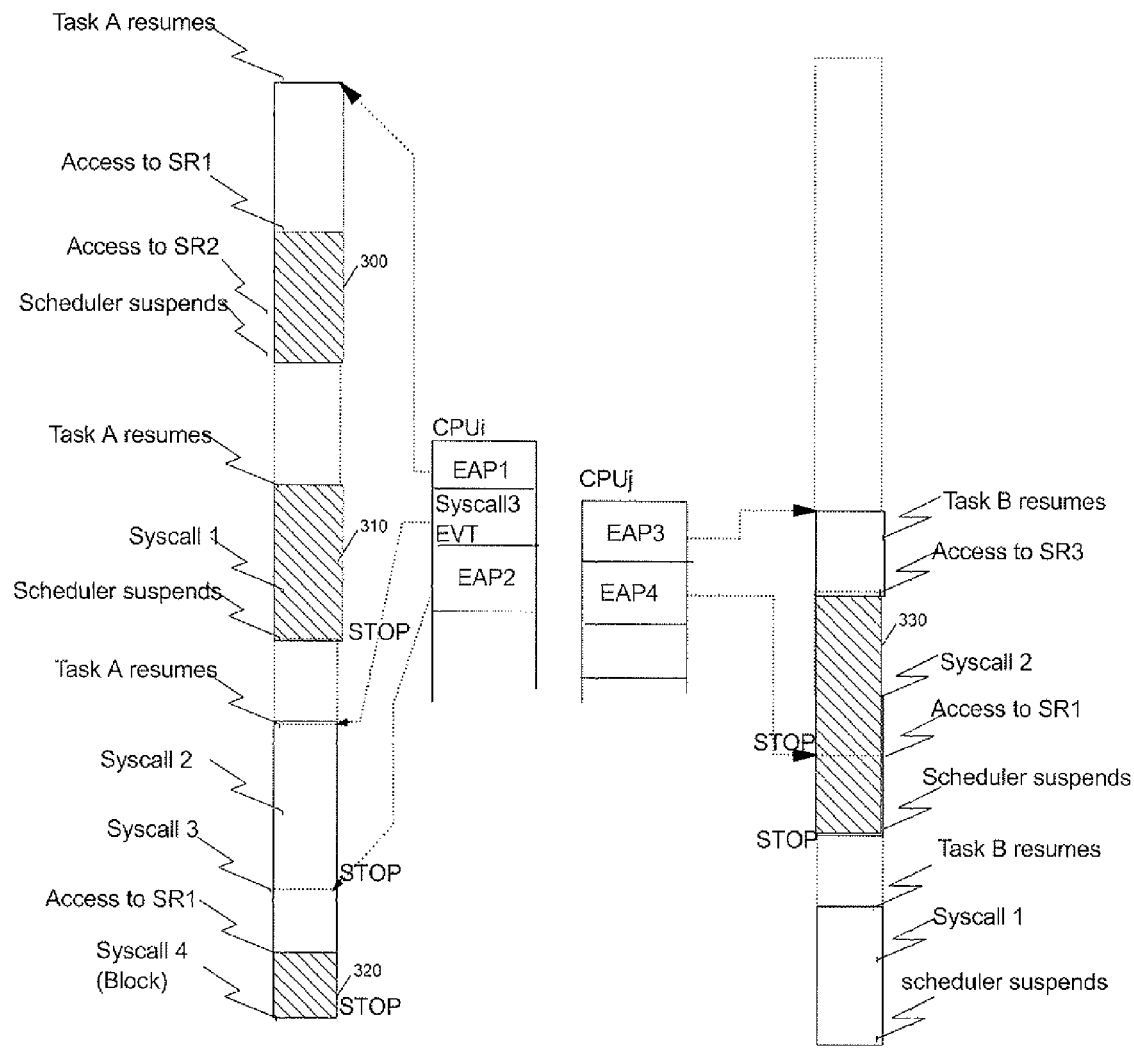
FIG. 3 illustrates the replay of event information during the task execution periods, wherein also illustrated are the successive Exclusive Access periods according to the preferred embodiment.

FIG. 3 shows a valid replaying session of a session already recorded as illustrated in FIG. 2. The replaying events are loaded from the fifo prior to resume the task, so a stop (STOP in FIG. 3) condition can be set. A stop condition matches at each interrupt. The stop condition defines the point in execution during replay at which the exclusive access to shared resources must be released, in order to match exactly the recorded EAP. The stop condition is read in advance, thus allowing an interrupt (either a performance counter overflow, or a breakpoint at a specific address in code) to be programmed, to force the execution to stop at the desired point. If the stop condition corresponds to the access to a system resource, or to a system call, then no further instrumentation is required, as the task execution will already be suspended at the right location and the kernel handler just needs to check if the stop condition is reached or not.

FIG. 3 illustrates task execution at replay by reuse of the event information stored in the processor queues CPUi and CPUj and transferred to the replay multiprocessor system. The execution for replay appears different from FIG. 2 in terms of task interleaving, but still behaves deterministically as in FIG. 2, as the ordering of exclusive access to the shared resources SR1 to SR3 is still maintained. However, the sequences of replay will be explained by the description of the new replay algorithm as described later in the document in relation with description of FIG. 5.

The EAP illustration of FIG. 2 and FIG. 3 are obtained by using new events, the EAP events and applying a new record and a replay algorithm using the EAP event information.

With the new method for recording and replaying execution of processes on multiprocessor computers, only one fifo queue per processor is used for logging of event information. In the per processor queues, only the EAP events are logged, that is the information stored at the end of an EAP and some events out of an EAP which are non-deterministic:
- the content of EAP event information logged at recording contains all the necessary information;
- a recording algorithm and a replay algorithm are applied, based on the logging of EAP event information and reuse of this information for replay. The EAP event variable size record logged in the CPU fifo at end of an EAP contains the following fields:
  - the number of system calls occurring during the EAP;
  - the number of shared resource access grants;
  - for each access grant, the shared resource unique id (SRID) and the shared resource sequence number (SRSN);
  - the number of user instructions with checksum and instruction pointer, the number of user instructions is relative to the last shared resource access or system call, which of them occurs last;
  - the stop condition type (instruction count stop, system call stop, or shared resource access stop). No more shared resource queues are used for record/replay. It is noted that the shared resource channel "shm" of the prior art is suppressed, its role being now filled by the shared resource sequence number (SRSN), which stores the global ordering information in the EAP record of the corresponding CPU channel.

During recording, the SRSN is incremented of 1 for each new EAP scheduling period start, as defined above. During replay, the constraint is to maintain the linear sequencing of SRSN whenever an event involving shared resources occurs. This allows to synchronize the otherwise decoupled CPU channels, exactly as it was done with the shm channel in the prior art.

The SRSN starts from the first shared resource access, which marks the start of an EAP. SRSN is associated in the EAP event information to the shared resource ID. This allows true parallelism as long as the shared resources used by simultaneous tasks are uncoupled.

The events relating to other sources of non-determinism needs to be recorded in the CPU log channels:
   IO system calls (pipes, socket, multiplexing . . . )
   Storage access
   External network events
   Time, date.

All other events to be considered are (so far) associated to system calls, except some machine instructions used to read the clock (RDTSC). With the concept of EAP, all non-deterministic events can be categorized in the following way:
   a single non-deterministic event (NDE), which involves no shared resources (for example, reading the time or computing a random number);
   a non-deterministic event involving the access to a shared resource. This kind of event is part of an EAP as opposed to the previous one, which can or not be part of an EAP;
   if an event involves output to an external system which cannot be rollbacked, such as a shared storage or a network client, then this event is called a non-abortable event and the sequence of events between 2 non-abortable events (not including the last one) is called an abortable sequence of events.

A consequence of this design is that event recording occurs not necessarily at each system interrupt, but only at the end of a relevant scheduling period (for shared resource access related events) when all the information about this scheduling period have been collected. The replay mechanism of prior art remains valid in its principle of checking stop conditions.

There are no more shared resource channels, the "CPU" channels are now sufficient to store alone all kinds of non-deterministic events, each event being complete and relevant. There is no impact on the processing of non-deterministic events related to resource virtualization (PID identifier under which a process is known by the Linux system and SHMID which identifies the shared memory segment in Linux) (Linux is a registered trademark of Linus Torvalds in the United States, other countries, or both), or other resources.

The constraints brought by the requirement of providing fault-tolerance without interruption of service (in the case of record and replay machines both active) are:
   considering a task that is under control of the recording layer (interrupted in kernel mode), it must not be resumed until the non-determinist event that induced the current state can be logged locally;
   considering that an external communication constitutes a non-return point in the execution flow, an external output from the application must not be sent until all the locally recorded events up to the output event itself are committed to the standby machine on which the replay will be performed.

A strong characteristic of the method according to the preferred embodiment is that all non-determinist events occur when in kernel mode, by the means of interrupts (system call or exceptions), where they can be detected, recorded and forced (at replay) in a transparent manner for the application. If it is not the default, the operating system is forced to behave this way (ex: shm access control).

Another interesting property of non-determinist events in kernel space is that their nature can be assessed before the event actually occurs. For example, it can be identified that that the next instruction is a shared memory access or is a system call with a given set of parameters. This allows checking if the next NDE is of fixed size (therefore allowing the extension of EAP) or not.

As a consequence, it is better to let the event happen entirely then attempt to record it, rather than having to reserve some space in advance, when it is detected that the next instruction is non-determinist.

Figure 4:
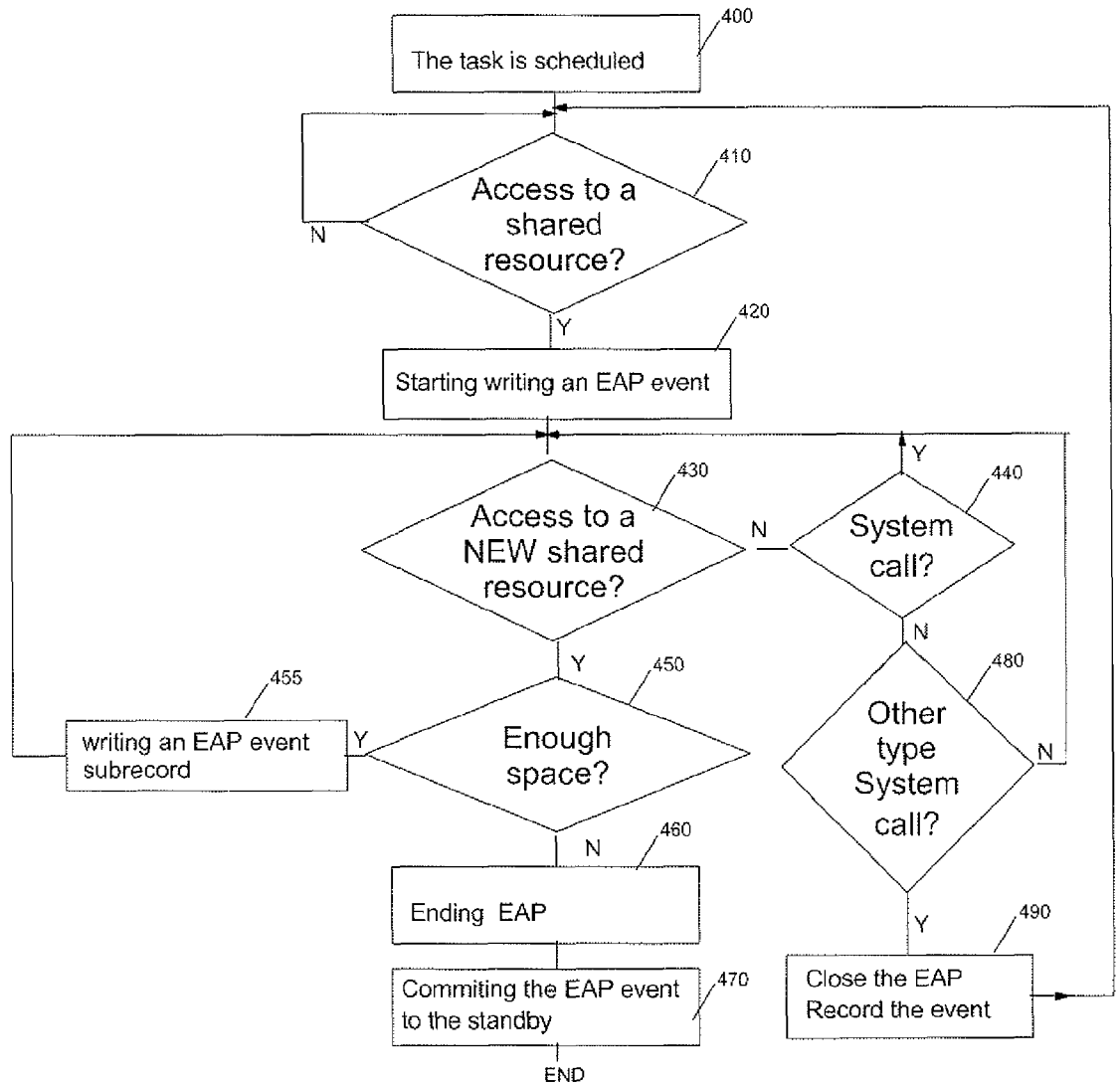
FIG. 4 illustrates a flowchart of the EAP event recording method according to the preferred embodiment.

FIG. 4 illustrates a flowchart of the EAP event recording method according to the preferred embodiment. At initial state (400) when the task is scheduled, it is not in an extended access period as all the shared resources are released. If the current number of shared resource access grant is 0, and the task gets the exclusive access to a shared resource (answer yes to test 410), then this is the start of an EAP. A new record is started (420).

If an EAP is started for the task, a new shared resource exclusive access is granted (answer yes to test 430), and if enough space (answer yes to test 450) for 1 sub-record (SRID, SRSN), then the number of grants is incremented, the sub-record is added to the CPU fifo (455), and the same EAP continues. If there is no space available (answer no to test 450), then the EAP is ended (460). Shared resources are released and the current EAP record is committed (470). The stop condition type is, therefore, set to "shared resource access".

If an EAP is started for the task and a system call is intercepted and if the syscall (based on the system call number) does not require a specific treatment (answer yes to 440), then the number of intercepted system call is incremented and the same EAP continues.

If an EAP is started for the task and if a variable size event of a different type is about to start (i.e. a storage input system call, or a network input system call) (answer yes to test 480), then the EAP is first closed and the event is recorded (490). The stopping condition (system call start, shared resource access, or timeslice expiration) is recorded. Multiple simultaneous recording and replay sessions are allowed. Each session has its own virtual namespace for system resource lDs (PIDs, SHMIDs . . . ), allowing overlap without interference.

A replay session defines as many virtual CPUs as were recorded. Events are de-queued from each CPU log in the corresponding session virtual CPU data structure. The initial starting event is, for instance, with Linux operating system, an execve system call which executes a process, with a per task sequence number set to 0 and a parent PID un-virtualized (forced to 1). The physical CPU not necessarily matches the virtual CPU. There is no control of inter-CPU migration of tasks during replay (or during record). For that reason, all the CPU log queues are scanned to retrieve the next event corresponding to the virtual task. A per task sequence number, having been set at recording to 0 at task creation (fork function in Linux to create a new process), then incremented at each task recorded event, provides the necessary ordering information, in case of inter-CPU task migration during the log (2 or more CPU logs matching the same virtual process identifier, PID in Linux).

At log event scan, if it matches the virtual PID of the task and the sequence number, then the event record is copied from the session's logical CPU record into the task information control block, for instance, the "cpulog_rec_t" data structure of the task descriptor "task_struct" in Linux. From that point, a new record from the virtual CPU log stream can be consumed.

Figure 5:
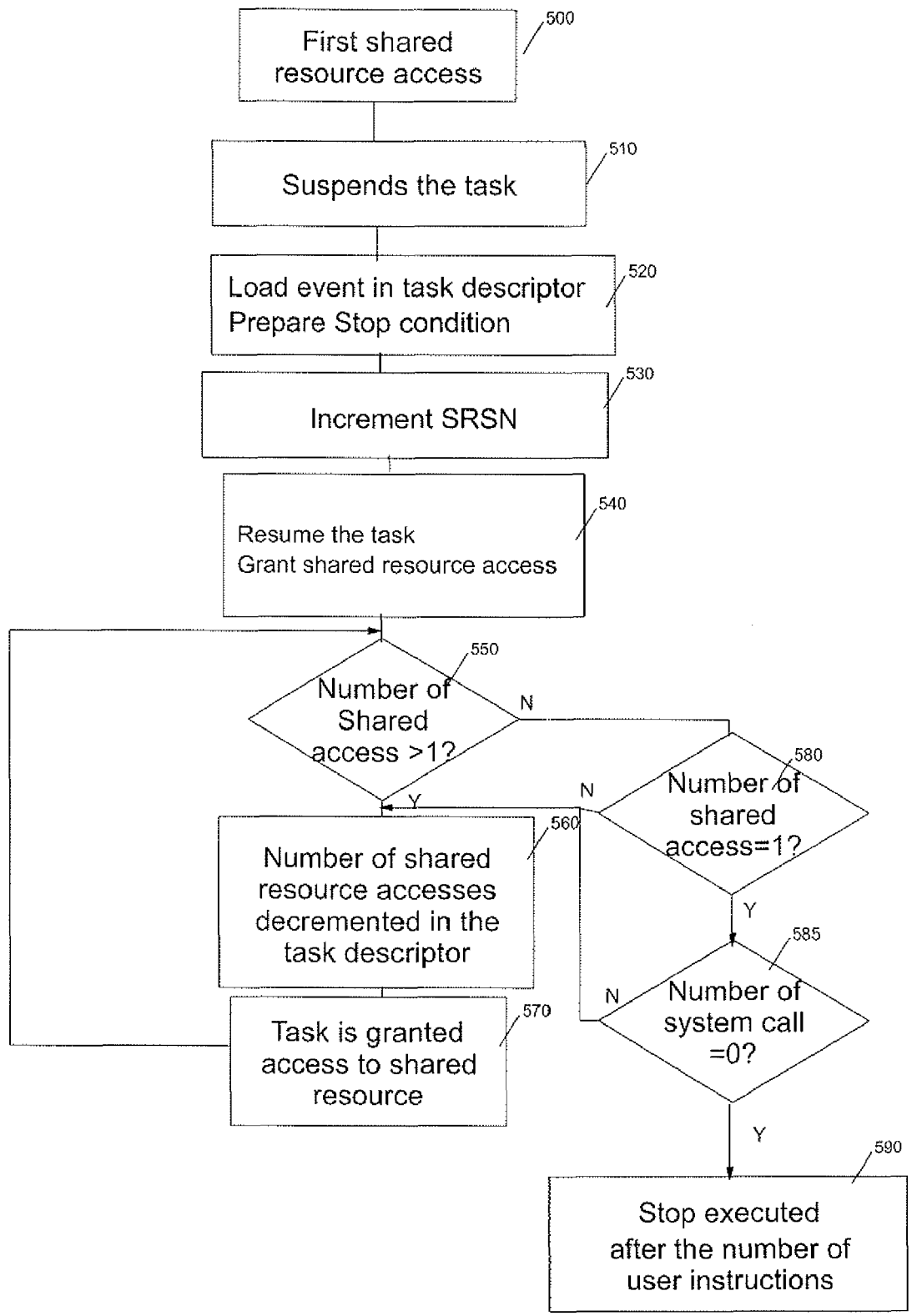
FIG. 5 illustrates a flowchart of the EAP event replaying method according to the preferred embodiment.

FIG. 5 illustrates a flowchart of the replaying method according to the preferred embodiment. The EAP event record loaded into the task descriptor allows determining the next stop condition (520) for the task. This has to be evaluated before resuming the task. The stop condition specifies how many system call interrupts, exclusive shared resource access grants and number of user instructions since the latest of previous ones, which need to be performed by the task prior to process the next event.

If the number of system calls and share resource access grants remaining for the EAP is 0 (answer yes to test 585), and if the stop condition is a user instruction count, then the UIC overflow/breakpoint procedure must be setup (520) prior to resume the task. The task will be suspended after the right number of user instructions.

Case of shared resource access order inversion: if the current number of shared resource access grants is 0 (in the task structure), then this is the first access (500) and the task is suspended (510) until the pair (shared resource id, shared resource sequence number) matches the current log record for the virtual CPU. When the match is reached, the current log record is consumed:

copied into the task structure (520)

the current shared resource sequence number is incremented (530) and the task is granted access (540).

If the current number of shared resource access grants is >1 (answer yes to test 550), then this number is decremented in the task descriptor (560) and the task is granted access (570). If the current number of shared resource access grants is 1 (answer yes to test 580) and the current number of system calls is >0 (in the task structure) (answer no to test 585), then the first number is zeroed (560) and the task is granted access.

If the current number of shared resource access grants is 1 (answer yes to test 580) and the current number of system calls is 0 (answer yes to test 585), then the first number is zeroed and the task is set to stop after the right number of user instructions (UIC) (590).

Figure 6:
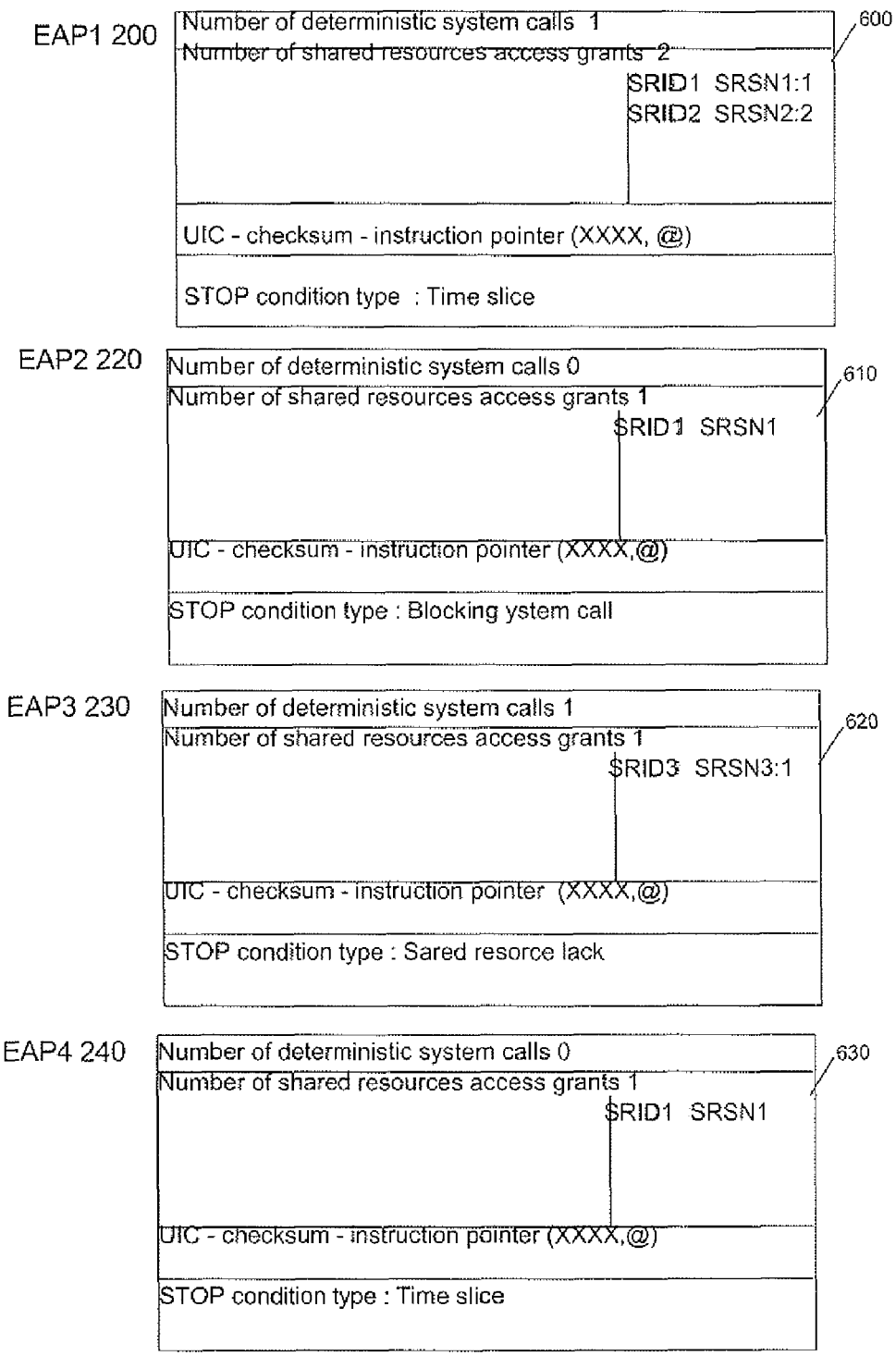
FIG. 6 illustrates the EAP event log during the recording session as illustrated in FIG. 2 according to the preferred embodiment.

FIG. 6 illustrates the EAP event logged during the recording session as illustrated in FIG. 2, according to the preferred embodiment. During the recording session, the first EAP event logged (600) is EAP1 (200) for task A on CPUi with one deterministic system call (Syscall1), two granted accesses to shared memory resources (SR1 and SR2 in this order) and the scheduler suspends at time slice; this will be the stop condition at replay. The second EAP event logged (610) is EAP2 (220) for task A on CPUi, which includes no deterministic system call, one granted shared resource SR1 and a stop condition with a blocking system call (Syscall4). A third EAP event logged (620) is EAP3 (230) for task B on CPUj which includes one deterministic system call (Syscall2), one granted shared resource SR3 and a stop condition on tempting to access a second shared resource SR1. A fourth EAP is logged (630), EAP4 (240) for task B on CPUj, which includes no deterministic system call, one granted shared resource SR1 and a stop condition for time slice, With the comprehension of the method for replaying the EAP events one can understand the replay sequence as illustrated in FIG. 3. For instance, the CPUi fifo content is read and each EAP event logged in the CPUi fifo for task A on CPUi is replayed. EAP1 as described in FIG. 6 is replayed. The task descriptor containing the counters of the EAP event decremented each time a deterministic system call or a shared resource access is granted and is saved at each time slice of the scheduler (300, 310) or each time a stop condition (320) is replayed. When the scheduler of the replaying machine resumes task A, the updated counters of the EAP event in the task descriptor are used to go on the EAP sequence (210) until a new time slice on the CPU of the replaying machine occurs or the stop condition of the replayed EAP event is reached.

It is noted that the usual non-deterministic events occurring during an activation period of a task without any shared resource access granted are stored independently of EAP events in the CPU fifo and replayed as usual. One example is the Syscall3 event which is logged as an independent event and replayed after EAP1 and before EAP2 during the replay session illustrated in FIG. 3.

This method preferably implemented as a record and a replay program including instrumentation of kernel, fits the need for generic fault tolerance systems allowing on the fly switch of one application to one production machine to one replay machine. This does not prevent using also this solution for program debugging purpose on the same machine.

What is claimed is:

1. A method for managing task events during a first scheduling period of a task executing on a processor of a computing device, the method comprising:

detecting when a first access to a first shared resource is granted and, in response to detecting the first access to the first shared resource being granted, setting a first counter, for counting a number of granted accesses to shared resources, to 1 and saving, in a data structure, both a shared resource id of the first shared resource and 1 as an order identifier that indicates an order in which the first shared resource has been granted access during this scheduling period;

until detection of an event preventing holding of one of the shared resources for which access has been already granted:

incrementing a second counter for each non-deterministic system call; and incrementing the first counter each time a new access to the first shared resource or another shared resource is granted and saving, in the data structure, a corresponding shared resource id and incrementing the order identifier indicating an order in which this shared resource has been granted access during this scheduling period; and upon detection of the event preventing holding of the first shared resource:

releasing a hold on the first shared resource; and logging in a fifo queue associated with the processor on which the task is executing, a record comprising a number of non-deterministic system calls based on a value of the second counter, a number of shared resource access grants based on a value of the first counter, and, for each access granted, a corresponding shared resource id and a corresponding order identifier identifying an order of granted access, a number of instructions with checksum and instruction pointer in code of the task, relative to a last system call or granted access to the first shared resource or another shared resource, whichever of them occurs last, and a type of event preventing holding of the first shared resource; and during the scheduling period of the task, and if the first access to the first shared resource has not been detected, upon occurrence of a non-deterministic event, recording the non-deterministic event information in the fifo queue associated with the processor on which the task is executing.

2. The method of claim 1 in which the detection of an event preventing holding of the first shared resource comprises detection of at least one of:

end of the scheduling period for the task upon expiration of timeslice;

a blocking system call;

a blocking access to the first shared resource or another shared resource already held by a concurrent task; and lack of available space in the fifo queue.

3. The method of claim 1 further comprising providing records stored in the fifo queue to another computer device for replay of events represented by the records stored in the fifo queue.

4. The method of claim 3 in which providing the records stored in the fifo queue to the other computer device for replay comprises transmitting the records stored in the fifo queue to a multi-processor standby machine.

5. The method of claim 1 further comprising, on a replay computing device, during a second scheduling period for replaying the task on:
- in response to detecting when a second access to the first shared resource is granted for a replay of the task:
- suspending the task;
- reading in a current record stored in the fifo queue a corresponding access granted to the first shared resource done during the first scheduling period of the task, such current record not being a non-deterministic event record; and
- copying contents of the current record a task descriptor of the task;
- preparing a stop condition corresponding to a type of event preventing holding of the first shared resource, read in the record;
- incrementing a third counter, in the task descriptor, for counting an order of granted access to the first shared resource;
- resuming the task in response to preparing the stop condition;
- granting, to the task, access to the first shared resource;
- until the stop condition is reached, at each granted access to the first shared resource or another shared resource, or at each deterministic system call, decrementing corresponding counters in the task descriptor; and
- upon detection of the stop condition, forcing a stop of execution of the task.

6. The method of claim 5 further comprising:
- detecting, in the task descriptor, whether a fourth counter of granted access to shared resources is greater than 1, and in response to the fourth counter of granted access to the shared resources being greater than 1, the fourth counter is decremented and access to the first shared resource or another shared resource is granted.

7. The method of claim 5 further comprising:
- in response to detecting, in the task descriptor, that a fourth counter of granted access to shared resources is 1 and a fifth counter of a number of system calls is greater than 0, then the fourth counter is zeroed and access to first shared resource of another shared resource is granted.

8. The method of claim 5 further comprising, each time the task is suspended by a timeslice condition by a scheduler of the replay computing device, the task descriptor is saved, and when the scheduler resumes the task, the replay continues until a new timeslice condition causes the scheduler to suspend the task or the stop condition of the current record is reached.

9. A system for managing task events during a first scheduling period of a task the system comprising:
- a processor;
- a data bus coupled to the processor; and
- a computer-usable medium embodying computer code, the computer-usable medium being coupled to the data bus, the computer program code comprising instructions executable by the processor and configured for:
- detecting when a first access to a first shared resource is granted and, in response to detecting the first access to the first shared resource being granted, setting a first counter, for counting a number of granted accesses to shared resources, to 1 and saving, in a data structure, both a shared resource id of the first shared resource and 1as an order identifier that indicates an order in which the first shared resource has been granted access during this scheduling period;
- until detection of an event preventing holding of one of the shared resources for which access has been already granted:
- incrementing a second counter for each non-deterministic system call; and
- incrementing the first counter each time a new access to the first shared resource or another shared resource is granted and saving, in the data structure, a corresponding shared resource id and incrementing the order identifier indicating an order in which this shared resource has been granted access during this scheduling period; and
- upon detection of the event preventing holding of the first shared resource:
- releasing a hold on the first shared resource; and
- logging in a fifo queue associated with the processor on which the task is executing, a record comprising a number of non-deterministic system calls based on a value of the second counter, a number of shared resource access grants based on a value of the first counter, and, for each access granted, a corresponding shared resource id and a corresponding order identifier identifying an order of granted access, a number of instructions with checksum and instruction pointer in code of the task, relative to a last system call or granted access to the first shared resource or another shared resource, whichever of them occurs last, and a type of event preventing holding of the first shared resource; and
- during the scheduling period of the task, and if the first access to the first shared resource has not been detected, upon occurrence of a non-deterministic event, recording the non-deterministic event information in the fifo queue associated with the processor on which the task is executing.

10. The system of claim 9 in which the detection of an event preventing holding of the first shared resource comprises detection of at least one of:
- end of the scheduling period for the task upon expiration of timeslice;
- a blocking system call;
- a blocking access to the first shared resource or another shared resource already held by a concurrent task; and
- lack of available space in the fifo queue.

11. The system of claim 9 further comprising providing records stored in the fifo queue to another computer device for replay of events represented by the records stored in the fifo queue.

12. The system of claim 11 in which providing the records stored in the fifo queue to the other computer device for replay comprises transmitting the records stored in the fifo queue to a multi-processor standby machine.

13. The system of claim 9 further comprising, on a replay computing device, during a second scheduling period for replaying the task:
- in response to detecting when a second access to the first shared resource is granted for a replay of the task:
- suspending the task;
- reading in a current record stored in the fifo queue a corresponding access granted to the first shared resource done during the first scheduling period of the task, such current record not being a non-deterministic event record; and copying contents of the current record a task descriptor of the task;

preparing a stop condition corresponding to a type of event preventing holding of the first shared resource, read in the record;

incrementing a third counter, in the task descriptor, for counting an order of granted access to the first shared resource;

resuming the task in response to preparing the stop condition;

granting, to the task, access to the first shared resource;

until the stop condition is reached, at each granted access to the first shared resource or another shared resource, or at each deterministic system call, decrementing corresponding counters in the task descriptor; and upon detection of the stop condition, forcing a stop of execution of the task.

14. A non-transitory computer-usable medium for managing task events during a first scheduling period of a task executing on at least one CPU of a multi-processor computer, the computer-usable medium embodying computer program code, the computer program code comprising computer executable instructions configured for:

detecting when a first access to a first shared resource is granted and, in response to detecting the first access to the first shared resource being granted, setting a first counter, for counting a number of granted accesses to shared resources, to 1 and saving, in a data structure, both a shared resource id of the first shared resource and 1 as an order identifier that indicates an order in which the first shared resource has been granted access during this scheduling period;

until detection of an event preventing holding of one of the shared resources for which access has been already granted:

incrementing a second counter for each non-deterministic system call; and incrementing the first counter each time a new access to the first shared resource or another shared resource is granted and saving, in the data structure, a corresponding shared resource id and incrementing the order identifier indicating an order in which this shared resource has been granted access during this scheduling period; and upon detection of the event preventing holding of the first shared resource:

releasing a hold on the first shared resource; and logging in a fifo queue associated with the processor on which the task is executing, a record comprising a number of non-deterministic system calls based on a value of the second counter, a number of shared resource access grants based on a value of the first counter, and, for each access granted, a corresponding shared resource id and a corresponding order identifier identifying an order of granted access, a number of instructions with checksum and instruction pointer in code of the task, relative to a last system call or granted access to the first shared resource or another shared resource, whichever of them occurs last, and a type of event preventing holding of the first shared resource; and during the scheduling period of the task, and if the first access to the first shared resource has not been detected, upon occurrence of a non-deterministic event, recording the non-deterministic event information in the fifo queue associated with the processor on which the task is executing.

15. The non-transitory computer-usable medium of claim 14 in which the detection of an event preventing holding of the first shared resource comprises detection of at least one of:

end of the scheduling period for the task upon expiration of timeslice;

a blocking system call;

a blocking access to the first shared resource or another shared resource already held by a concurrent task; and lack of available space in the fifo queue.

16. The non-transitory computer-usable medium of claim 14 further comprising providing records stored in the fifo queue to another computer device for replay of events represented by the records stored in the fifo queue.

* * * * *